(12) United States Patent
He

(10) Patent No.: US 9,472,142 B2
(45) Date of Patent: Oct. 18, 2016

(54) DISPLAY ASSEMBLY AND LCD DEVICE

(71) Applicant: SHENZHEN CHINA STAR OPTOELECTRONICS TECHNOLOGY CO., LTD, Shenzhen (CN)

(72) Inventor: Jhenwei He, Shenzhen (CN)

(*) Notice: Subject to any disclaimer, the term of this patent is extended or adjusted under 35 U.S.C. 154(b) by 1 day.

(21) Appl. No.: 14/235,086

(22) PCT Filed: Jan. 10, 2014

(86) PCT No.: PCT/CN2014/070433
§ 371 (c)(1),
(2) Date: Mar. 18, 2015

(87) PCT Pub. No.: WO2015/100783
PCT Pub. Date: Jul. 9, 2015

(65) Prior Publication Data
US 2015/0310810 A1    Oct. 29, 2015

(30) Foreign Application Priority Data

Dec. 31, 2013 (CN) .......................... 2013 1 0751743

(51) Int. Cl.
*G09G 3/36* (2006.01)
*G02F 1/1335* (2006.01)
(Continued)

(52) U.S. Cl.
CPC ............. *G09G 3/36* (2013.01); *G02F 1/13363* (2013.01); *G02F 1/13471* (2013.01); *G02F 1/133504* (2013.01); *G02F 1/133528* (2013.01); *G09G 3/3406* (2013.01); *G09G 3/3648* (2013.01);
(Continued)

(58) Field of Classification Search
CPC ............... G09G 2300/023; G09G 2320/0252; G09G 3/36; G09G 2310/06; G02F 1/1393; G02F 1/133528; G02F 2300/023; G02F 2001/133638; G02F 2001/133342; G02F 2001/133541; G02F 1/1396
USPC .......................................................... 345/4, 6
See application file for complete search history.

(56) References Cited

U.S. PATENT DOCUMENTS 5,861,929 A * 1/1999 Spitzer ............... G02B 27/0093
                                                    257/E27.111
6,587,083 B1 * 7/2003 Basturk ............. G02F 1/133536
                                                    345/4

(Continued)

FOREIGN PATENT DOCUMENTS

CN          102213860 A      10/2011
CN          202443187 U       9/2012
(Continued)

OTHER PUBLICATIONS

Li Qi, the International Searching Authority written comments, Sep. 2014, CN.

*Primary Examiner* — Sanjiv D Patel

(57) ABSTRACT

A liquid crystal display (LCD) device includes a first LCD panel and a second LCD panel. The first LCD panel is arranged on a backlight source, and is the black mode, the second LCD panel is the white mode. A response time of the first LCD panel changing from the black mode to the white mode is less than a response time of the second LCD panel changing from the black mode to the white mode, and a response time of the first LCD panel changing from the white mode to the black mode is longer than a response time of the second LCD panel changing from the white mode to the black mode.

13 Claims, 3 Drawing Sheets

(51) Int. Cl.
   *G02F 1/13363*    (2006.01)
   *G02F 1/1347*     (2006.01)
   *G09G 3/34*       (2006.01)

(52) U.S. Cl.
   CPC ........... *G02F 2001/133638* (2013.01); *G09G 2300/023* (2013.01); *G09G 2310/024* (2013.01); *G09G 2320/0233* (2013.01)

(56) References Cited

U.S. PATENT DOCUMENTS

| | | | |
|---|---|---|---|
| 7,218,365 B2 | 5/2007 | Chang et al. | |
| 2008/0084521 A1* | 4/2008 | Sugiyama | G02F 1/133621 349/70 |
| 2008/0088649 A1* | 4/2008 | Ikeno | G09G 3/3611 345/690 |
| 2009/0027323 A1* | 1/2009 | Choi | G02F 1/13471 345/88 |
| 2009/0027598 A1* | 1/2009 | Ikeno | G02F 1/13471 349/77 |
| 2009/0066621 A1* | 3/2009 | Iwamoto | G09G 3/3406 345/88 |
| 2010/0118006 A1* | 5/2010 | Kimura | G09G 3/3611 345/205 |
| 2015/0086799 A1* | 3/2015 | Kasyanova | C09D 177/06 428/474.4 |

FOREIGN PATENT DOCUMENTS

| | | |
|---|---|---|
| CN | 103135273 A | 6/2013 |
| CN | 103309097 A | 9/2013 |
| CN | 203299486 U | 11/2013 |

\* cited by examiner

DISPLAY ASSEMBLY AND LCD DEVICE

TECHNICAL FIELD

The present disclosure relates to display devices, and more particularly to a display assembly and a liquid crystal display (LCD) device.

BACKGROUND

Liquid crystal display (LCD) devices obtain a normal display state through controlling deflection of a liquid crystal (LC). The deflection of the LC incurs a response time, thus, display quality of the LCD device is determined by response speed of the LC. If the response time of the LC is long, some display defects are formed, such as a smear.

Usually, a voltage applied in the LCD device is improved to shorten the response time of the LC, thus, a driving circuit of an LCD panel needs to be improved, but a physical limit of the deflection of the LC has not been changed in the above-mentioned method. The LCD device needs be further improved to obtain better display quality.

SUMMARY

The aim of the present disclosure is to provide a display assembly and a liquid crystal display (LCD) device that are seldom affected by response time of deflection of a liquid crystal (LC) and have good display quality.

The aim of the present disclosure is achieved by the following methods.

A display assembly comprises a backlight source providing a light source a first liquid crystal display LCD) panel arranged on the backlight source, and a second LCD panel arranged on the first LCD panel, where the first LCD panel is a black mode and the second LCD panel is a white mode. A response time of the first LCD panel changing from the black mode to the white mode is less than a response time of the second LCD panel changing from the black mode to the white mode, and a response time of the first LCD panel changing from the white mode to the black mode is longer than a response time of the second LCD panel changing from the white mode to the black mode.

Furthermore the first LCD panel employs a twisted nematic (TN) liquid crystal (LC), and the second LCD panel employs an electrically controlled birefringence (ECB) LC.

Furthermore, the first LCD panel employs a TN LC, and the second LCD panel employs a vertical alignment (VA) LC.

Furthermore, the first LCD panel employs a TN LC, and the second LCD panel employs an in-plane switching (IPS) LC.

Furthermore, the first LCD panel employs a TN LC, and the second LCD panel employs the TN LC.

Furthermore, an optical phase retardation film is arranged between the first LCD panel and the second LCD panel.

Furthermore, the optical phase retardation film comprises a positive birefringent single-axis film A-plate and a negative birefringent single-axis film C-plate, or the optical phase retardation film only consists of the A-plate or the C-plate.

Furthermore, a diffuser is arranged at a light emitting surface of the second LCD panel.

A display assembly comprises a backlight source providing a light source, a first liquid crystal display (LCD) panel arranged on the backlight source, and a second LCD panel arranged on the first LCD panel, where the first LCD panel is a white mode and the first LCD panel is a white mode. A response time of the first LCD panel changing from the white mode to the black mode is less than a response time of the second LCD panel changing from the white mode to the black mode, and a response time of the first LCD panel changing from the black mode to the white mode is longer than a response time of the second LCD panel changing from the black mode to the white mode.

A liquid crystal display device comprises any one of the above-mentioned display assemblies.

The LCD device of the present disclosure comprises a first LCD panel and a second LCD panel according to different response times of LC deflection. The first LCD panel is arranged on the backlight source, and is a black mode, the second LCD panel is a white mode. The response time of the first LCD panel changing from the black mode to the white mode is less than the response time of the second LCD panel changing from the black mode to the white mode, and the response time of the first LCD panel changing from the white mode to the black mode is longer than the response time of the second LCD panel changing from the white mode to the black mode. The display of the LCD device changing from the black mode to the white mode is obtained through the first LCD panel of the black mode, and the display of the LCD device changing from the white mode to the black mode is obtained through the second LCD panel being white mode. The above-mentioned method uses the response time of the first LCD panel changing from the black mode to the white mode and the response time of the second LCD panel changing from the white mode to the black mode to compensate a defect of the response time of single panel, and effectively improves a display quality of the display device.

DETAILED DESCRIPTION

The present disclosure will further be described in detail in accordance with the figures and the exemplary examples.

EXAMPLE 1

Figure 1:
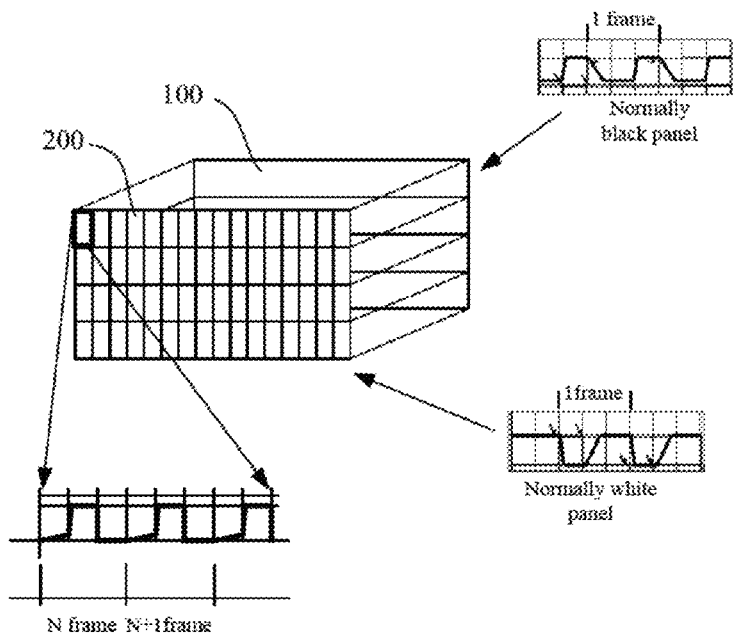
FIG. 1 is schematic diagram of a double-panel and a response time of the double-panel of a first example of the present disclosure.
Figure 2:
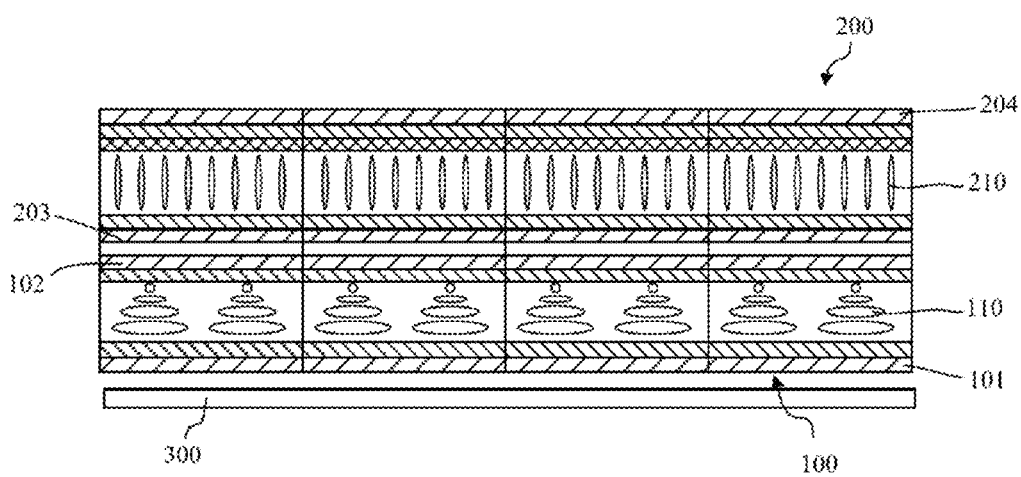
FIG. 2 is structural diagram of a display assembly of a first example of the present disclosure.

As shown in FIG. 1 and FIG. 2, a first example of the present disclosure provides a liquid crystal display (LCD) assembly comprising a first LCD panel 100, a second LCD panel 200, and a backlight source 300. The first LCD panel 100 is arranged on the backlight source 300, and is a black mode, and the second LCD panel 200 is a white mode. A response time of the first LCD panel 100 changing from the black mode to the white mode is less than a response time of the second LCD panel 200 changing from the black mode to the white mode, and a response time of the first LCD panel 100 changing from the white mode to the black mode is longer than a response time of the second LCD panel 200 changing from the white mode to the black mode. An incident surface of the first LCD panel is configured with a first polarizer 101, and a light emitting surface of the first LCD panel 100 is configured with a second polarizer 102. An incident surface of the second LCD panel 200 is configured with a third polarizer 203, and a light emitting surface of the second LCD panel 200 is configured with a fourth polarizer 204. The first LCD panel 100 of the black mode and the second LCD panel 200 of the white mode can be obtained through adjusting deflection of a liquid crystal (LC) and an arrangement of each of the polarizers.

As shown in FIG. 1, the response time of the first LCD panel 100 of the black mode changing from the black mode to the white mode is short in one frame picture, but the response time of the first LCD panel 100 of the black mode changing from the white mode to the black mode becomes long. The response time of the second LCD panel 200 of the white mode from the white mode to the black mode is short in one frame picture, but the response time of the second LCD panel of the white mode changing from the black mode to the white mode becomes long. In the first example, a display method of the LCD assembly is provided as follows: the display of the LCD assembly changing from the black mode to the white mode is obtained through the first LCD panel 100 of the black mode, and the second LCD panel 200 of the white mode does not work, the display of the LCD assembly changing from the white mode to the black mode is obtained through the second LCD panel 200 of the white mode, and the first LCD panel 100 of the black mode does not work. The above-mentioned method uses the response time of the first LCD panel 100 changing from the black mode to the white mode and the response time of the second LCD panel 200 changing from the white mode to the black mode to compensate defect of the response time of single panel, and effectively improves display quality of a display device.

In the first example, the first LCD panel 100 employs a twisted nematic (TN) liquid crystal (LC) 110, and the second LCD panel 200 employs a vertical alignment (VA) LC 210. It should be understood that the second LCD panel 200 may also employ an in-plane switching (IPS) LC, an electrically controlled birefringence (ECB) LC, or the TN LC.

EXAMPLE 2

Figure 3:
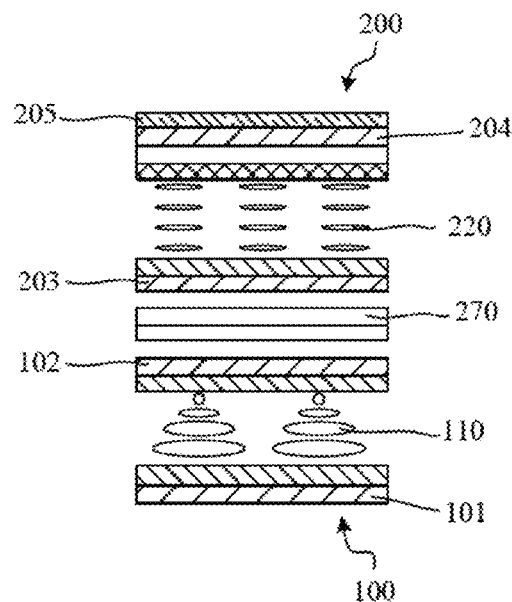
FIG. 3 is structural diagram of a display assembly of a second example of the present disclosure.

As shown in FIG. 3, a second example is improved on a basis of the first example. The first example employs a double-panel, when an image is displayed, an image dislocation may be obtained from a wide view angle.

In order to reduce the image dislocation, the second example provides an optical phase retardation film 270 arranged between the first LCD panel 100 and the second LCD panel 200, the optical phase retardation film 270 controls light divergence, thereby reducing the image dislocation. In the second example, the optical phase retardation film 270 comprises a positive birefringent single-axis film A-plate and a negative birefringent single-axis film C-plate. It should be understood that the optical phase retardation film 270 may only consist of the A-plate or the C-plate. In the present disclosure, the optical phase retardation film 270 controls the light divergence of the light emitting surface of the LCD panel, any arrangement manner of the optical phase retardation film 270 avoiding the image dislocation can be used.

Figure 4:
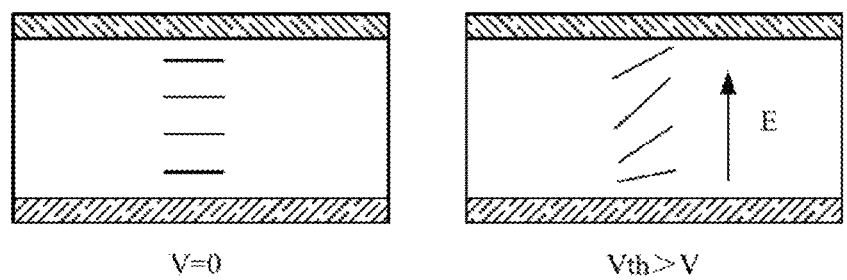
FIG. 4 is a schematic diagram of deflection characteristics of an electrically controlled birefringence (ECB) liquid crystal (LC).

The optical phase retardation film 270 may affect the view angle of the display device, in order to avoid affecting the view angle of the display device, the first LCD panel 100 of the second example employs the TN LC, and the second LCD panel 200 of the second example employs the ECB LC. The light divergence of the TN LCD panel is small, thus, image dislocation is avoided as far as possible in the LCD device having the double-panel. The ECB LCD panel has advantages of good separating peak voltages of three colors (red, green, and blue), low work voltage, and the view angle with symmetrical azimuth in an entire plane, which enlarges the view angle of the display device. As shown in FIG. 4, a deflection state of the ECB LC is shown under an influence of an electric field, the deflection state is good for diverging the light, thereby enlarging the view angle of the display device.

Figure 5:
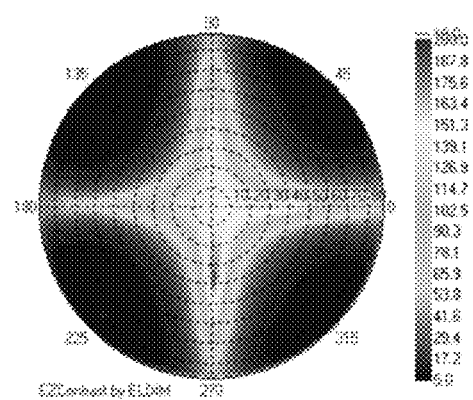
FIG. 5 is an analytical diagram of wide view angle and high contrast ratio of a display assembly of a second example of the present disclosure.

In the second example, a diffuser 205 having high haze is arranged on the light, emitting surface of the second LCD panel 200 to further enlarge the view angle of the display device, which compensates a restricted view angle due to the optical phase retardation film 270. The second LCD panel 200 having the ECB LC has a similar display effect with the IPS panel, thus, an image having good quality is displayed. As shown in FIG. 5, the display assembly of the second example not only has a large range of view angle, but also has a high contrast ratio.

EXAMPLE 3

Figure 6:
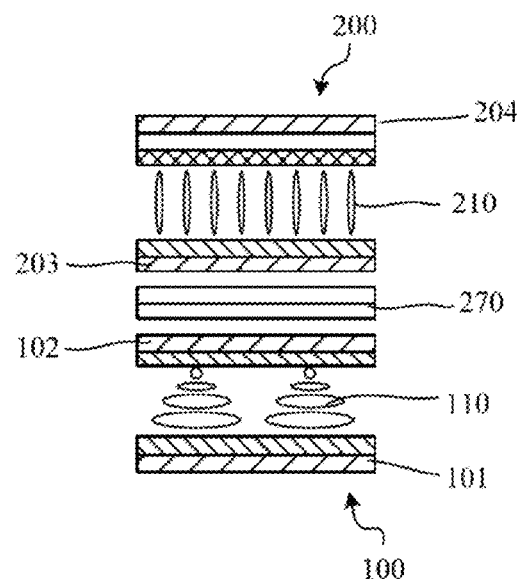
FIG. 6 is structural diagram of a display assembly of a third example of the present disclosure.

As shown in FIG. 6, a third example is provided, a difference between the third example and the first example is that the optical phase retardation film 270 is arranged between the first LCD panel 100 and the second LCD panel 200. Thus, the image dislocation is reduced.

EXAMPLE 4

As shown in FIG. 3, a difference between a fourth example and the first or second example is provided as follows: the first LCD panel 100 arranged on the backlight source 300 is the white mode, the second LCD panel 200 is the black mode, where a response time of the first LCD panel 100 changing from the white mode to the black mode is less than a response time of the second LCD panel 200 changing from the white mode to the black mode, and a response time of the first LCD panel 100 changing from the black mode to the white mode is longer than a response time of the second LCD panel changing from the black mode to the white mode. The incident surface of the first LCD panel 100 is configured with the first polarizer 101, and the light emitting surface of the first LCD panel 100 is configured with the second polarizer 102. The incident surface of the second LCD panel 200 is configured with the third polarizer 203, and the light emitting surface of the second LCD panel 200 is configured with the fourth polarizer 204. The first LCD panel 100 of the white mode and the second LCD panel 200 of the black mode can be obtained through adjusting the deflection way of the LC and the arrangement of each of the polarizers.

The present disclosure is described in detail in accordance with the above contents with the specific exemplary examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

I claim:

1. A display assembly, comprising:
a backlight source providing a light source;
a first liquid crystal display (LCD) panel arranged on the backlight source, and the first LCD panel is a black mode; and
a second LCD panel arranged on the first LCD panel, and the second LCD panel is a white mode;
a response time of the first LCD panel changing from the black mode to the white mode is less than a response time of the second LCD panel changing from the black mode to the white mode, and a response time of the first LCD panel changing from the white mode to the black mode is longer than a response time of the second LCD panel changing from the white mode to the black mode,
wherein a light emitting surface of the first LCD panel is configured with a first polarizer, an incident surface of the second LCD panel is configured with a second polarizer;
wherein an optical phase retardation film is arranged between the first polarizer and the second polarizer.

2. The display assembly of claim 1, wherein the first LCD panel employs a twisted nematic (TN) liquid crystal (LC), and the second LCD panel employs an electrically controlled birefringence (ECB) LC.

3. The display assembly of claim 1, wherein the first LCD panel employs a TN LC, and the second LCD panel employs a vertical alignment (VA) LC.

4. The display assembly of claim 1, wherein the first LCD panel employs a TN LC, and the second LCD panel employs an in-plane switching (IPS) LC or the TN LC.

5. The display assembly of claim 1, the optical phase retardation film comprises a positive birefringent single-axis turn A-plate and a negative birefringent single-axis film C-plate, or the optical phase retardation film only consists of the A-plate or the C-plate.

6. The display assembly of claim 1, wherein a diffuser is arranged at a light emitting surface of the second LCD panel.

7. A display assembly, comprising:
a backlight source providing a light source;
a first liquid crystal display (LCD) panel of the white mode arranged on the backlight source; and
a second LCD panel of the black mode arranged on the first LCD panel;
a response time of the first LCD panel changing from the white mode to the black mode is less than a response time of the second LCD panel changing from the white mode to the black mode, and a response time of the first LCD panel changing from the black mode to the white mode is longer than a response time of the second LCD panel changing from the black mode to the white mode,
wherein a light emitting surface of the first LCD panel is configured with a first polarizer, an incident surface of the second LCD panel is configured with a second polarizer;
wherein an optical phase retardation film is arranged between the first polarizer and the second polarizer.

8. A liquid crystal display (LCD) device, comprising:
a backlight source providing a light source;
a first liquid crystal display (LCD) panel arranged on the backlight source, and the first LCD panel is a black mode; and
a second LCD panel arranged on the first LCD panel, and the second LCD panel is a white mode;
a response time of the first LCD panel changing from the black mode to the white mode is less than a response time of the second LCD panel changing from the black mode to the white mode, and a response time of the first LCD panel changing from the white mode to the black mode is longer than a response time of the second LCD panel changing from the white mode to the black mode,
wherein a light emitting surface of the first LCD panel is configured with a first polarizer, an incident surface of the second LCD panel is configured with a second polarizer;
wherein an optical phase retardation film is arranged between the first polarizer and the second polarizer.

9. The LCD device of claim 8, wherein the first LCD panel employs a twisted nematic (TN) liquid crystal (LC), and the second LCD panel employs an electrically controlled birefringence (ECB) LC.

10. The LCD device of claim 8, wherein the first LCD panel employs a TN LC, and the second LCD panel employs a vertical alignment (ECB) LC.

11. The LCD device of claim 8, wherein the first LCD panel employs a TN LC, and the second LCD panel employs an in-plane switching (IPS) LC or the TN LC.

12. The LCD device of claim 8, wherein the optical phase retardation film comprises a positive birefringent single-axis film A-plate and a negative birefringent single-axis film C-plate, or the optical phase retardation film only consists of the A-plate or the C-plate.

13. The LCD device of claim 8, wherein a diffuser is arranged at a light emitting surface of the second LCD panel.

* * * * *